(12) United States Patent
Franke et al.

(10) Patent No.: US 9,086,122 B2
(45) Date of Patent: Jul. 21, 2015

(54) DISMANTLING A GEAR MECHANISM OF A WIND POWER PLANT

(75) Inventors: Jan-Bernd Franke, Elmshorn (DE); Marco Arndt, Lagerdorf (DE)

(73) Assignee: SENVION SE, Hamburg (DE)

( * ) Notice: Subject to any disclaimer, the term of this patent is extended or adjusted under 35 U.S.C. 154(b) by 143 days.

(21) Appl. No.: 13/821,075

(22) PCT Filed: Sep. 6, 2011

(86) PCT No.: PCT/EP2011/004474
§ 371 (c)(1),
(2), (4) Date: Mar. 6, 2013

(87) PCT Pub. No.: WO2012/034660
PCT Pub. Date: Mar. 22, 2012

(65) Prior Publication Data
US 2013/0178326 A1    Jul. 11, 2013

(30) Foreign Application Priority Data

Sep. 13, 2010  (DE) .......................... 10 2010 040 654

(51) Int. Cl.
  F16H 1/28      (2006.01)
  F16H 57/08     (2006.01)
  F03D 11/02     (2006.01)
  F16H 1/46      (2006.01)

(52) U.S. Cl.
CPC ...... *F16H 1/28* (2013.01); *F03D 11/02* (2013.01); *F16H 57/082* (2013.01); *F05B 2230/70* (2013.01); *F05B 2260/40311* (2013.01); *F16H 1/46* (2013.01); *Y02E 10/722* (2013.01); *Y10T 29/49462* (2015.01)

(58) Field of Classification Search
CPC ......... F03D 11/02; F16H 57/082; F16H 1/28; F16H 1/46
USPC ........................................... 475/331, 337, 343
See application file for complete search history.

(56) References Cited

U.S. PATENT DOCUMENTS

| | | | |
|---|---|---|---|
| 440,717 A | 11/1890 | Mower | |
| 8,414,448 B2 * | 4/2013 | Madge et al. ................. | 475/331 |
| 8,550,955 B2 * | 10/2013 | Erno et al. .................... | 475/331 |
| 2003/0008748 A1 * | 1/2003 | Fox ............................... | 475/346 |
| 2011/0243740 A1 * | 10/2011 | Siegfriedsen ................. | 475/331 |
| 2012/0028754 A1 * | 2/2012 | Lopez et al. .................. | 475/331 |
| 2012/0277056 A1 * | 11/2012 | Erno et al. .................... | 475/331 |
| 2013/0217535 A1 * | 8/2013 | Suzuki et al. ................. | 475/331 |

FOREIGN PATENT DOCUMENTS

| | | |
|---|---|---|
| DE | 10334448 | 2/2005 |
| DE | 60102794 | 4/2005 |

(Continued)

*Primary Examiner* — Jacob S Scott
(74) *Attorney, Agent, or Firm* — Rankin, Hill & Clark LLP

(57) ABSTRACT

A gear mechanism (22) of a wind power plant (10) that includes at least one planetary stage (24.1, 24.2) that has at least one planet gear carrier (41, 61) and a method for dismantling a multi-stage gear mechanism (22) of a wind power plant (10). The gear mechanism (22) is arranged in a nacelle (15) arranged on a tower (11) of a wind power plant (10). The gear mechanism (22) has at least one planetary stage (24.1, 24.2) and the at least one planetary stage (24.1, 24.2) has a planet gear carrier (41, 61) and several planet gears (45, 65) held in the planet gear carrier (41, 61) using planetary bolts (47, 67). The planet gears (45, 65) are in operative connection with a ring gear (49, 69) of the planetary stage (24.1, 24.2) surrounding the planet gears (45, 65).

9 Claims, 10 Drawing Sheets

(56) References Cited

FOREIGN PATENT DOCUMENTS

| | | |
|---|---|---|
| DE | 10357026 | 6/2005 |
| DE | 202005013328 | 2/2006 |
| DE | 102008063044 | 7/2010 |
| DE | 102010017464 A1 * | 12/2011 |
| EP | 1677032 | 7/2006 |
| FR | 553430 | 5/1923 |
| JP | 57058163 | 4/1982 |
| WO | 2007071124 | 6/2007 |

* cited by examiner

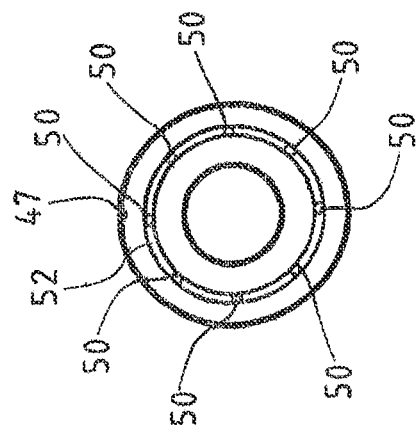
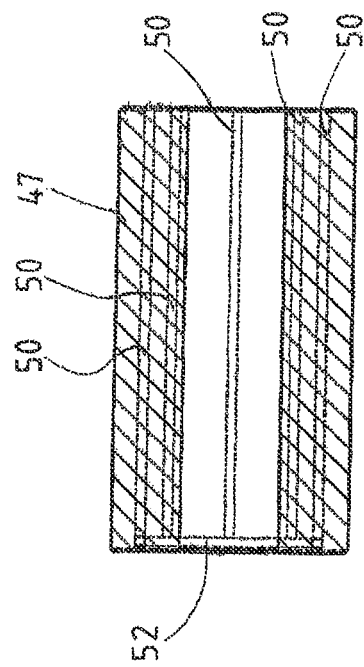
Fig. 9b
Fig. 9a

DISMANTLING A GEAR MECHANISM OF A WIND POWER PLANT

BACKGROUND OF THE INVENTION

1. Field of the Invention

The invention relates to a method for dismantling a multi-stage gear mechanism of a wind power plant, wherein the gear mechanism is arranged in a nacelle arranged on a tower of a wind power plant. The gear mechanism has at least one planetary stage and the at least one planetary stage has a planet gear carrier and several planet gears held in the planet gear carrier using planetary bolts. The planet gears are in operative connection with a ring gear of the planetary stage surrounding the planet gears.

The invention further relates to a gear mechanism of a wind power plant having at least one planetary stage, wherein the planetary stage has at least one planet gear carrier and several planet gears held in the planet gear carrier using planetary bolts. The planet gears are in operative connection with a ring gear surrounding the planetary stage and the planet gear carrier has two side plates between which the planet gears are or will be held by means of the respective bolt. The side plates have bolt receptacles for the planetary bolts, in which the planetary bolts or the ends of the planetary bolts are or will be received. The invention further relates to a use of a multi-stage gear mechanism of a wind power plant.

Wind power plants of the patent applicant are known under the description 5M, MM92, MM82, MM70 and MD77. The wind power plants can be erected both on the ground (onshore) or in bodies of water (offshore).

In the case of wind power plants, the rotors of the wind power plant are connected to a gear mechanism and a generator via a drive train. The wind power plant hereby generally has a rotor shaft, on one end of which the rotor shaft is coupled to the rotor and on the other end of which the rotor shaft is coupled to the gear mechanism. The rotor blades of the wind power plant are fastened on a rotor hub, which is in turn connected to the rotor shaft. The rotational movement of the rotor is transferred to the gear mechanism via the rotor shaft so that the gear mechanism is in operative connection with a generator via a generator-side output.

In the case of generic wind power plants, the gear mechanism can be multi-stage, wherein the gear mechanism generally has one or more planetary stages and, if applicable, one or more gear mechanism stages (spur gear stages).

The first gear mechanism stage of a multi-stage gear mechanism in generic wind power plants is frequently designed as a planetary stage, wherein the rotor is coupled with the planet gear carrier or the ring gear of the planetary stage. The planetary stage hereby generally consists of a sun gear, around which several planet gears meshing with the sun gear are arranged, wherein the planet gears are mounted in a planet gear carrier. The sun gear, the planet gears and parts of the planet gear carrier are surrounded by a ring gear, wherein the ring gear is designed such that it meshes with the planet gears. Either the sun gear or the planet gear carrier, or respectively the ring gear is driven corresponding to the direction of the gear mechanism ratio.

2. Description of Related Art

For example, in DE-B-103 57 026 and DE-B-103 34 448 wind power plants with multi-stage gear mechanisms are described.

BRIEF SUMMARY OF THE INVENTION

Based on this state of the art, the object of the invention is to perform maintenance measures, preferably in a nacelle, on a multi-stage, gear mechanism for an erected wind power plant, particularly offshore wind power plant in a simple manner.

This object is solved by a method for dismantling a multi-stage gear mechanism of a wind power plant, wherein the gear mechanism is arranged in a nacelle arranged on a tower of a wind power plant. The gear mechanism has at least one planetary stage and the at least one planetary stage has a planet gear carrier and several planet gears held in the planet gear carrier using planetary bolts. The planet gears are in operative connection with a ring gear of the planetary stage surrounding the planet gears, wherein the following method steps are. The ring gear and the planet gears are axially distanced from each other along a substantially horizontal axis such that the operative engagement between the planet gears and the ring gear is or will be released, wherein particularly one or more planet gears held in the planet gear carrier are accessible from the outside. The retaining connection between a planet gear and the planet gear carrier is released, preferably before or after the axial distancing of the ring gear and the planet gears. Before the removal of the planet gear, the respective planetary bolt is released from the clamped position thereof in a clamp device, preferably from the retaining position in a bolt receptacle of the planet gear carrier. And the planet gear released from the fixed connection with the planet gear carrier is removed outward in the radial direction to the longitudinal axis of the gear mechanism.

The invention is based on the idea that with a multi-stage gear mechanism of a wind power plant having at least one planetary stage, the planet gear carrier with the planet gears and the ring gear surrounding the planet gears are separated from each other, and thus the planet gears of the planet gear carrier and the ring gear are axially spaced from each other in the longitudinal axial running direction and parallel to the axis of rotation of the rotor or a rotational axis of a sun gear of the gear mechanism. As a result, the meshing operative engagement between the planet gears and the ring gear, the part of the housing of the gear mechanism surrounding the planet gears, is disengaged, wherein the axial separating of the planet gear carrier and the ring gear is performed in a nacelle of a wind power plant on a tower. The axial separation occurs along a substantially horizontal axis, wherein substantially horizontal means that the axis, or respectively axis of rotation of the rotor is inclined between 2° and 15°, preferably between 3° and 8° to the horizontal (so-called tilt angle of the rotor). In doing so, due to the restricted spatial conditions in a closed nacelle, the planet gear carrier and the ring gear are separated from each other by at least one tooth width of the planet gear of the planetary stage, for example by sliding axially. With the sliding axially along the axis of rotation of the sun gear of the gear mechanism, one component, for instance the planet gear carrier or the ring gear respectively, in each case remains in the fixed operating position thereof, whereas the second component, for instance the ring gear or the planet gear carrier, is axially slid with respect to the fixed component. This means that for the fixed component the spacing to the rotor or to the tower axis is not changed with respect to the operating position.

In order to expose a planet gear for replacement that during axially movement of the opened housing of the gear mechanism is moved by somewhat more than a single tooth width up to triple the tooth width of the planet gears of the planet stage, with the restricted spatial conditions in a nacelle, then, the planet gear that is accessible or exposed at the gear mechanism can be removed radially outward or dismantled from the planet gear carrier, that is, transverse, particularly perpendicular to the axis of rotation of the sun gear.

For this purpose, it is provided in the scope of the invention that the retention force of a press fit between the planet gear carrier and the planetary bolt which supports a planet gear is reduced so that after axial or with radial displacement of the planetary bolt, the planet gear is correspondingly removed from the planet gear carrier.

The planet gear carrier of a multi-stage gear mechanism generally represents a mechanically highly stressed component of a gear mechanism. Generally, a planet gear carrier of a gear mechanism is mounted using a front bearing and a rear bearing in the gear mechanism housing, whereby the planet gear carrier is securely positioned in the gear mechanism housing. Further, with the (typically) used gear mechanisms three or four planet gears are arranged in the radial direction on the planet gear carrier.

Because little space remains between the planet gears arranged on the planet gear carrier, in order to connect together a front side plate and a rear side plate of the planet gear carrier, which support the bearings of the planet gear carrier, the two side plates are or will be connected together and stiffened also using the planetary bolts supporting the respective planet gear. For this purpose, the planetary bolts are press fit fixed in the bolt receptacles formed in the side plates of the planet gear carrier. A release of the planetary bolts of the planet gear carrier that are press fit in the side plates, or respectively in the bolt receptacles, is only possible by applying strong forces, for example by hydraulic pushing devices or the like, wherein with the impact of strong forces on the planetary bolts for removal, there is the danger that the precise manufactured fit surfaces of the side plates and the bolt receptacles formed in the side plates and the planetary bolts are damaged in doing so.

On the other hand, according to the invention, the retention force between the planet gear carrier, or respectively the side plates of the planet gear carrier, and the planetary bolts is reduced in a simple manner without the impact of hydraulic pushing devices and the like, so that after reducing the retention force, the planetary bolts are released from the bearing, or respectively the retaining connection thereof, from the opened gear mechanism.

According to the invention it is provided that the respective planetary bolt for a planet gear is released whereby the retaining connection between the planet gear and the planet gear carrier is released, preferably from the retained position in a bolt receptacle of the planet gear carrier, or respectively in the side plates of the planet gear carrier, before removing the planet gear out of the clamped position thereof in a clamp device.

For this purpose, in a preferred embodiment of the method it is further provided that the planetary bolt, particularly after releasing the clamped position or retaining position in the bolt receptacle, is moved in the longitudinal axial direction or in the transverse axial direction. Hereby, the planetary bolt is correspondingly displaced in the position thereof, whereby it is then possible to disassemble, or respectively to remove, the planet gear from the planet gear carrier.

Preferably, the retaining connection between the planet gear and the planet gear carrier is released in that the retention force of the retaining connection, by which a press fit is or will be formed between the planet gear carrier and the planetary bolts, is reduced, and whereby afterwards the planetary bolt is moved for removal of the planet gear.

Particularly with movement of the planetary bolt in the longitudinal axial direction, the planetary bolt is moved relative to the planet gear, wherein particularly in a further method step the planet gear is then removed.

Moreover, in a preferred embodiment of the method it is further provided that before the removal of the planet gear, the planetary bolt, with the use of a channel formed in the planetary bolt, is supplied with oil or with a cooling media, so that by pressurizing the contact points between the planetary bolts and the planet gear carrier, preferably in the region of the press fit between the planet gear carrier and the planetary bolt, with oil the clamped points of the planetary bolt are loosened, or the planetary bolt is loosened by cooling the planetary bolt by applying the cooling means in the at least one hole of the planetary bolt in the clamped position thereof.

In an alternative embodiment it is further provided that with movement of the planetary bolt in the transverse axial direction, the planetary bolt and the planet gear are removed together, whereby the planetary bolt and the planet gear are simultaneously moved outward in the radial direction.

For that purpose, it is also provided in a preferred embodiment of the method that the retaining connection between the planet gear and the planet gear carrier, formed with one or two side plates, is loosened in that the retention force of the retaining connection, which is formed by a bolt receptacle in the side plate or by bolt receptacles in the two side plates for the planetary bolt, is reduced, wherein the bolt receptacle in the side plate or the bolts receptacles in the side plates are opened by releasing the connection of two side plate parts of one or each side plate, particularly outer and inner side plate part, along a division formed in the side plate or in the side plates. Preferably, the gear mechanism has multiple part side plates with dividable bolt receptacles for a planetary bolt of a planet gear, wherein particularly the side plates each have an inner side plate part and at least one outer side plate part. For a planetary bolt, the planetary bolt receptacles of both side plates are each formed by one outer side plate part and one inner side plate part of a side plate, interacting respectively.

As an alternative to an embodiment of the planet gear carrier having two side plates, a further (alternative) embodiment of the planet gear carrier also provides a division of the bolt receptacles in the case of a single side plate planet gear carriers, that is, planet gear carriers with only one side plate for the planet gears arranged thereon, with which the planetary bolts are clamped on only one side for the respective planet gear (so-called cantilevered mounting).

By impinging a line or channels in the planetary bolt, that are preferably formed parallel to the longitudinal axis of the planetary bolt, an expansion of the holes or the bolt receptacles is attained at the contact points with the side plates due to pressurization with oil, whereby the planetary bolt is axially movable and after an axial movement, the planet gear can be removed radially outward.

With an alternative embodiment, using a cooling means line or cooling channels in planetary bolts, which likewise are formed in the bolts parallel to the longitudinal axis of the planetary bolts, by introducing a cryogenic liquid, for example liquid nitrogen as a cooling means, a brief strong cooling of the bolt is attained, whereby due to the thermal expansion of the planetary bolt, the bolt contracts in the geometric dimensions thereof such that the axial movement of the planetary bolt is or will be possible.

Moreover, in a further development of the method it is provided that with the axial spacing of the ring gear and the planet gears from each other, the planet gears are moved with respect to the ring gear, that is preferably fixed, or the ring gear is moved with respect to the planet gears arranged fixed in the planet gear carrier. In the scope of the invention, a component of the gear mechanism, such as the ring gear, planet gear carrier and the like, arranged fixed in the nacelle is understood to be a component with which during the method according to the invention in the operating position, the offset to the rotor or to the tower axis remains substantially unchanged, or respectively constant with respect to the operating position.

Moreover, the object is solved by a gear mechanism of a wind power plant having at least one planetary stage, wherein the planetary stage has at least one planet gear carrier and several planet gears held in the planet gear carrier using planetary bolts, and wherein the planet gears are in operative connection with a ring gear, surrounding the planet gears of the planetary stage, wherein the planet gear carrier has two side plates between which the planet gears are or will be held by means of the respective planetary bolts, wherein the side plates have bolt receptacles for the planetary bolts in which the planetary bolts, or the ends of the planetary bolts, are or will be received, that is further characterized in that for a planetary bolt, the bolt receptacles of both side plates are or will be formed in each case in combination of an outer side plate part and an inner side plate part of a side plate.

Being the case that with a multi-stage gear mechanism a divided, or respectively separable, bolt receptacle is provided for a planetary bolt in the planet gear carrier, it is attained that the retaining connection between a planet gear and the planet gear carrier, in the form of the planetary bolt, is released with an opened gear mechanism, whereby after releasing the retaining connection, the planet gear, accessible from outside, is or will be removed outward in the radial direction, that is, transversal and perpendicular to the longitudinal axis of the gear mechanism or to the axis of rotation of the sun gear. Hereby it is possible to exchange planet gears or planet bearings in a nacelle of an existing wind power plant in a simple manner without having to lift out or exchange the complete gear mechanism from the nacelle, in a complex manner.

By opening the multiple part bolt receptacle or receptacles, the retention force between the planet gear carrier and the planetary bolts is released, whereby after removing the loosened outer side plate part, the planetary bolt is released, whereby the planet gear and the planetary bolt together can be moved outward.

Therefore, in a further development of the gear mechanism it is provided that the outer side plate part is clampable with or connectable to the inner side plate part of a side plate using clamping elements, preferably clamping bolts. Thus, the multiple part side plate, consisting of at least one inner side plate part and at least one outer side plate part, can be connected together using clamping elements, or respectively screws, wherein the threaded connection, or the clamped connection is released for removing a planet gear, or respectively a planetary bolt.

A preferred embodiment of the gear mechanism is further characterized in that the outer side plate part and the inner side plate part of a side plate have semi-circular cavities for forming a circular bolt receptacle, which with the arrangement of a planetary bolt in the bolt receptacle, the cavity of the outer side plate part and the inner side plate part in the closed state of the side plate surrounds the planetary bolt in a complementary shape.

Further, the outer side plate part preferably has holes for receiving clamping elements, particularly clamping bolts, wherein particularly the holes are arranged in multiple rows, preferably double rows, next to each other along a partial circle-shaped outside of the outer side plate part.

Additionally, in one embodiment it is further provided that during tensioning of the outer side plate part with the inner side plate part of a side plate, the length of the clamping elements, particularly the clamping screws, decreases with increasing distance to the planetary bolt axis.

Furthermore an embodiment of the gear mechanism is characterized in that the screws or clamping elements used for the connection of the outer side plate part to the inner side plate part are formed at least in parts as expansion bolts, wherein particularly the screws or clamping elements lying close to the planetary bolt axis are formed as the expansion bolts. Hereby, a reliable connection is attained between the outer side plate part and the inner side plate part, such that with an arrangement of a planetary bolt in a bolt receptacle and tensioning of the outer side plate part to the inner side plate part, the planetary bolt is held, or respectively fixed, reliably in the continuous operation of the gear mechanism.

Furthermore, the object of the invention is solved by the use of a preferably multi-stage gear mechanism in a nacelle arranged on a tower of a wind power plant, wherein the gear mechanism is provided as described above.

With known (offshore) wind power plants of the patent applicant with power of 5 MW to 6 MW, the tooth width of the planet gears in the planetary stage of the gear mechanism, or respectively the first gear stage, typically amount to approximately between 500 mm to 750 mm. Due to the spatial conditions in a machine cabin or a nacelle of such a system, it is only possible to axially shift the gear mechanism parts, or respectively components of a gear mechanism, between 0.5 m to 1.5 m due to the crowded arrangement of the system in the nacelle. Thus, little structural space remains between the components for maintenance personnel when a multi-stage gear mechanism is opened and for instance a ring gear is slid in the axial direction.

In the scope of the invention it is provided that, for example, before the longitudinal axial sliding of a ring gear of a gear mechanism, appropriate support devices and the like are used in order to secure the ring gear or the planet gears for example from falling out, before sliding the ring gear. Preferably the disassembly of a planet gear of a first planet stage or the second planet stage, that is, the planet stage facing away from the rotor, can be performed, wherein here the gear mechanism is separated between the second planetary stage and the spur gear facing away from the rotor. Depending on the structural conditions, the planet gear carrier of the second planetary stage is to be correspondingly supported using support devices, or the like.

In the scope of the invention, it is provided that for dismantling a gear mechanism of a wind power plant, using a gear mechanism described above which has multiple part side plates with separable bolt receptacles for a planetary bolt of a planet gear, the above described method is performed.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below in an exemplary manner, without restricting the general intent of the invention, based on exemplary embodiments with reference to the drawings, whereby we expressly refer to the schematic drawings with regard to the disclosure of all details according to the invention that are not explained in greater detail in the text. They show:

FIG. 9a is a sectional elevation view of a planetary bolt;

FIG. 9b is a plan view of a planetary bolt for a planet gear, and

In the following figures, the same or similar types of elements or respectively corresponding parts are provided with the same reference numbers so

DETAILED DESCRIPTION OF THE INVENTION

Figure 1:
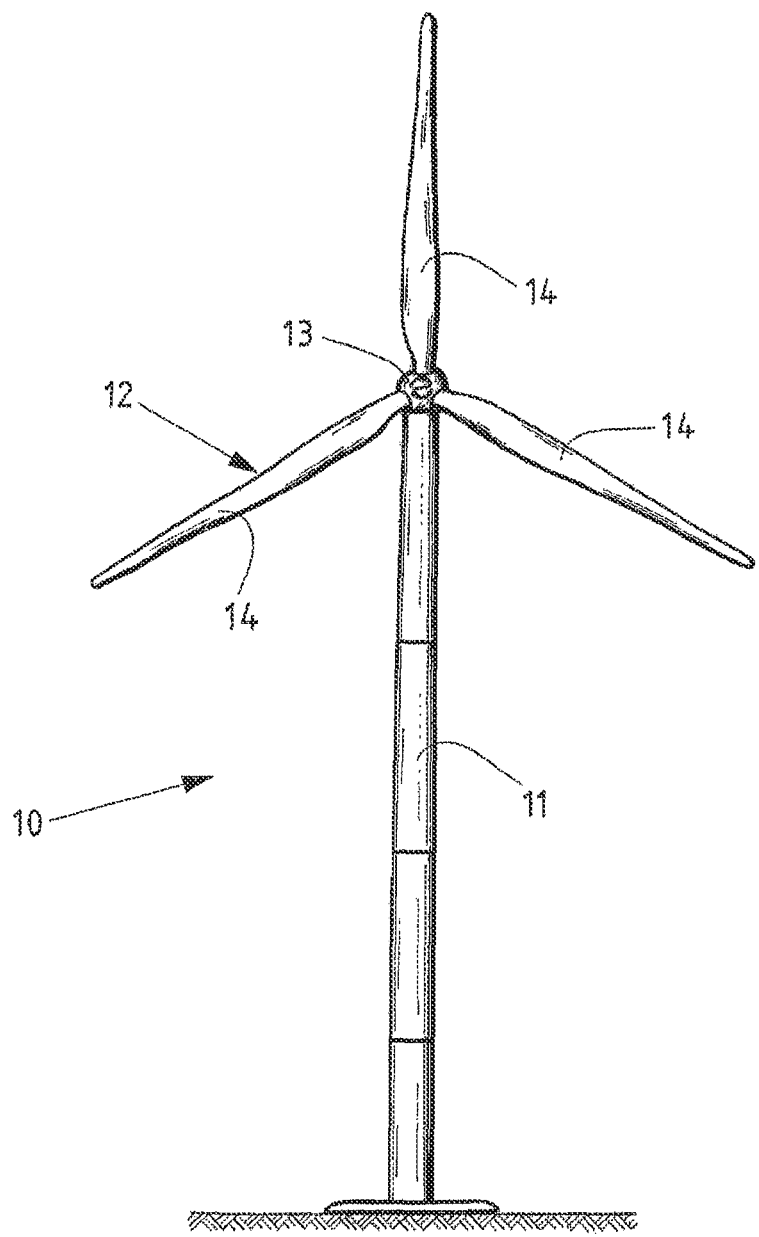
FIG. 1 is an elevation view of a wind power plant.

FIG. 1 shows a schematic representation of a wind power plant 10. The wind power plant 10 has a tower 11 and a rotor 12, which comprises three rotor blades 14, which are attached to a rotor hub 13. When there is wind, the rotor 12 turns in the known manner. Power from a generator connected to the rotor 12 or respectively to the rotor hub 13 can hereby be generated in a machine cabin (see FIG. 2) arranged on the tower 11 and behind the rotor 12 and supplied to a consumer network.

Figure 2:
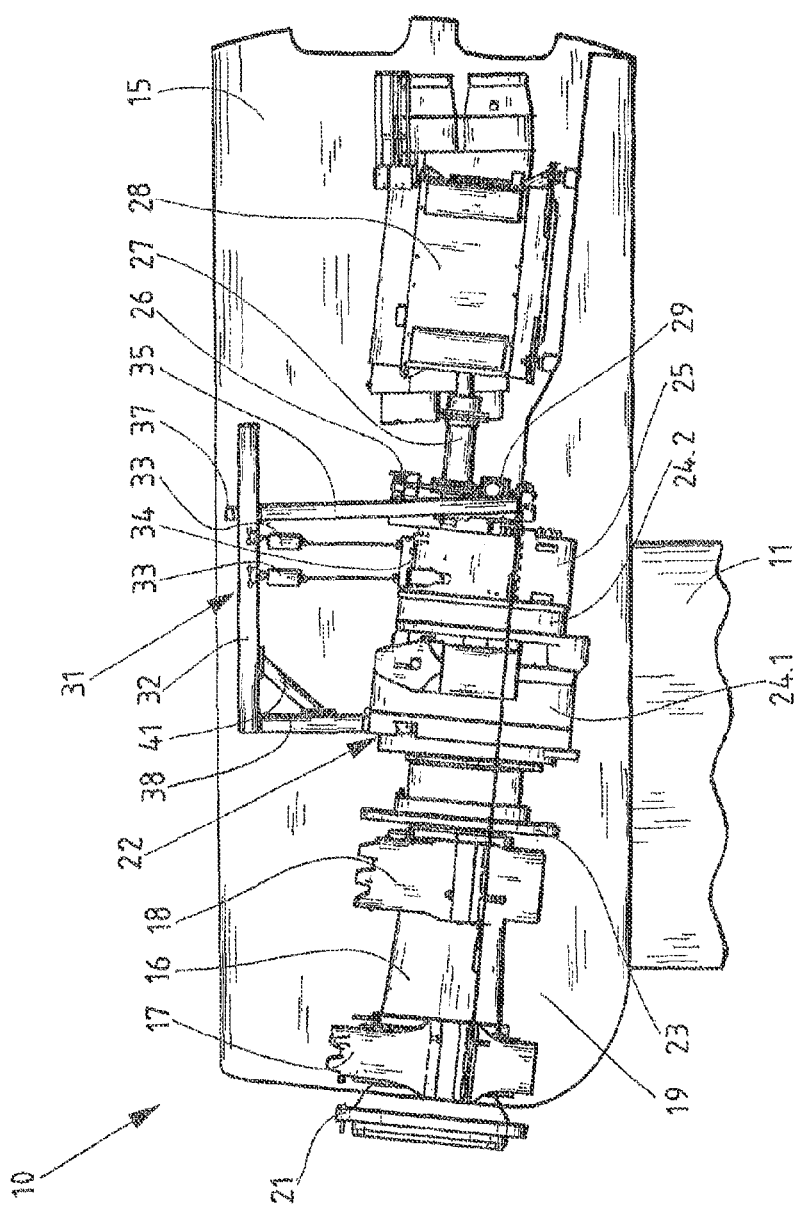
FIG. 2 is a partial sectional elevation view of a nacelle of a wind power plant.

FIG. 2 shows a schematic cross-sectional view of a machine cabin 15 or respectively a nacelle arranged on the tower 11 of the wind power plant 10. In the rotor-side area of the machine cabin 15, a rotor shaft 16 is mounted in two bearing supports 17, 18 on a slightly tilted machine frame 19. The rotor shaft 16 projects towards the rotor side out of the machine cabin 15 and has a rotor flange 21 on the outside, on which the rotor 12 or respectively the rotor hub 13 of a rotor is fastened (see FIG. 1).

The side of the rotor shaft 16 facing away from the rotor 12 is connected to a multi-stage gear mechanism 22 in the machine cabin 15, wherein a locking device 23 is provided between the bearing bracket 18 and the inlet side of the gear mechanism 22 so that the rotor 12 can be or respectively is locked during the standstill for maintenance work on the wind power plant 10.

The multi-stage gear mechanism 22 consists of two planetary stages 24.1, 24.2 arranged behind each other, which are in mechanical operative connection with each other. Moreover, the second planetary gear mechanism stage 24.2 is in operative connection with a rear spur gear stage 25 of the gear mechanism 22.

Through the multi-stage gear mechanism 22, the low rotational speed of the rotor shaft 16 is converted over several stages into a high speed of an output shaft, which drives a generator 28 via a clutch 27. Within the scope of the invention, it is possible that the multi-stage gear mechanism 22 can also have a planetary stage and two spur gear stages or any another combinations of stages.

A rotor brake 26 as well as the clutch or respectively generator clutch 27 are arranged on the generator-side or respectively the side of a drive shaft of the spur gear stage 25 facing away from the rotor. The clutch 27 is thereby connected to the generator shaft. A slip ring unit 29 for the blade adjustment of the rotor blades 14 (FIG. 1) is arranged in extension of the rotor shaft axis below the rotor brake 26. The slip ring unit 29 forms the power supply device for the rotor hub 13 (FIG. 1) together with a cable tube running through the gear mechanism 22 into the rotor shaft 26.

Above the gear mechanism 22 a lifting device 31, formed as a frame, is arranged and is supported on the rotor-side end thereof on the gear mechanism 22, or respectively on the first planetary stage 24.1. The lifting device 31 on the generator-side end is fastened laterally next to the spur gear stage 25 on the base frame, or respectively on the machine frame 19.

The lifting device 31 has two cross heads 32 lying next to each other, or respectively extending next to each other, perpendicular to the plane of representation in FIG. 2, along the longitudinal extension of the machine cabin 15, and upon which respectively two schematically sketched chain hoists are arranged moveably, preferably horizontally movable, as a lifting means. The four chain hoists, respectively two chain hoists 33 per cross head 32, are connected to the upper part of the spur gear stage 25 using a fastening plate 34.

The lifting device 31 is composed of several individual parts, or respectively steel beams, which can be handled manually or using a deck crane of the wind power plant 10, preferably permanently installed, and can be lifted as individual parts into the machine cabin 15. This means that both the weight of the individual parts, or respectively the beams, as well as the dimensions thereof, are subject to strict limitations.

The lifting device 31 has two supports arranged perpendicular laterally at the spur gear stage 25 on the machine frame 19, of which only the front support 35 can be seen, and which during installation of the lifting device 31 are first positioned individually and connected together at the upper end with a horizontal cross beam 37, such that the lateral supports in connection to the cross beam 37 form the shape of an upside-down "U". Then, the horizontal cross heads 32 are arranged at the bottom side of the cross beam 37, wherein the rotor-side ends of the cross heads 32 are supported on the first gear mechanism stage 24.1 using perpendicularly arranged supports 38.

For reinforcing the connections of the lateral supports to the cross beams 37, appropriate diagonal stabilizer bars are provided in the corner regions. Furthermore, also for mechanically stabilizing the cross heads 32, diagonal longitudinal rods are provided in the corner region to the rotor-side supports 38.

The lower bases of the supports 35, 38 are formed at the lower end with an incline that corresponds to the incline of the machine frame 19 in the machine cabin 15, so that when the supports 35, 36, 39 are arranged perpendicularly, the cross heads 32 and the cross beams 37 are arranged horizontally.

For dismantling the rear spur gear stage 25 with the second planetary stage 24.2 from the adjacent first planetary stage 24.1, the clutch 27 between the gear mechanism 22 and the generator 28 is removed. Furthermore, the pitch feedthrough and the energy supply device for the rotor hub are dismantled, preferably completely, before dismantling the gear mechanism 22. For this purpose, due to a lack of space, the cable tube, which runs through the gear mechanism 22 up into the rotor shaft 16, is implemented having multiple parts.

Next, the fastening plate 34 is mounted on the spur gear stage 25, such that after releasing the connection between the first planetary stage 24.1 and the second planetary stage 24.2, the spur gear stage 25 with the second planetary stage 24.2 is slid axially, and then, the spur gear stage 25, is fixed if necessary with spacers. Thereafter, appropriate components, or respectively planet gears of the first planetary stage 24.1 are removed radially outward through the arising axial gap between the first planetary stage 24.1 and the second planetary stage 24.2.

Next, an exchange occurs, for example, of a planet gear of a planet gear carrier on the first planetary stage 24.1, wherein after the completed exchange of the planet gear, the reassembly takes place in the reverse sequence of the method steps.

Using the lifting device 31, individual stages of a gear mechanism, or respectively the gear mechanism 22, can be spaced in an axial direction, independently of whether the gear mechanism has one planetary stage, and multiple spur gear stages, or multiple planetary stages and one spur gear stage.

The embodiment of a gear mechanism 22 shown in FIG. 2 is provided with two planetary stages, wherein after the first planetary stage 24.1, a second, narrower planetary stage 24.2 is provided. The second planetary stage 24.2 is connected on the generator-side to a spur gear stage 25.

Due to this separation, or respectively axial displacement, of the spur gear stage 25 together with the second planetary stage 24.2, from the first planetary stage 24.1, using the lifting device 31, it is possible to access the planet gears of the first planetary stage 24.1, and thus to enable the exchange or respectively repair thereof, in the closed machine cabin 15 of the wind energy plant 10.

This achieves that the dismantling of a multi-stage gear mechanism and the repair of the gear mechanism occur on the system, or respectively in the machine cabin 15, such that a complete exchange of the entire gear mechanism is no longer required.

After performing the maintenance work and/or repairs and assembly of the disassembled gear mechanism, the lifting device 31 is preferably disassembled again into the manageable individual parts, and if necessary removed from the machine cabin 15.

In the scope of the invention it is also possible that with use of the lifting device 31, the spur gear stage 25 and the second planetary stage 24.2 can be separated from each other, in order to perform maintenance measures on, or respectively in the second planetary stage 24.2.

Figure 3:
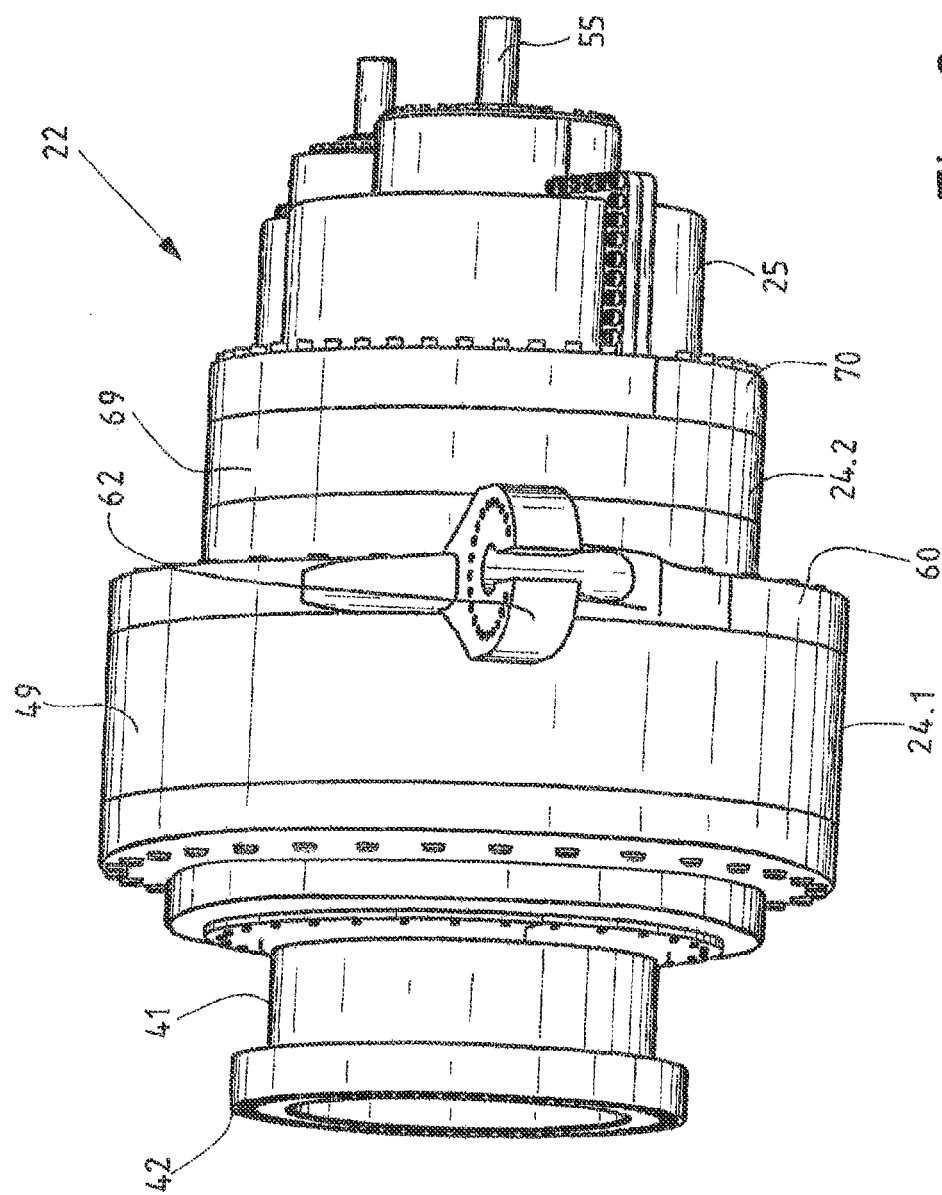
FIG. 3 is a perspective view of a multi-stage gear mechanism of a wind power plant.
Figure 4:
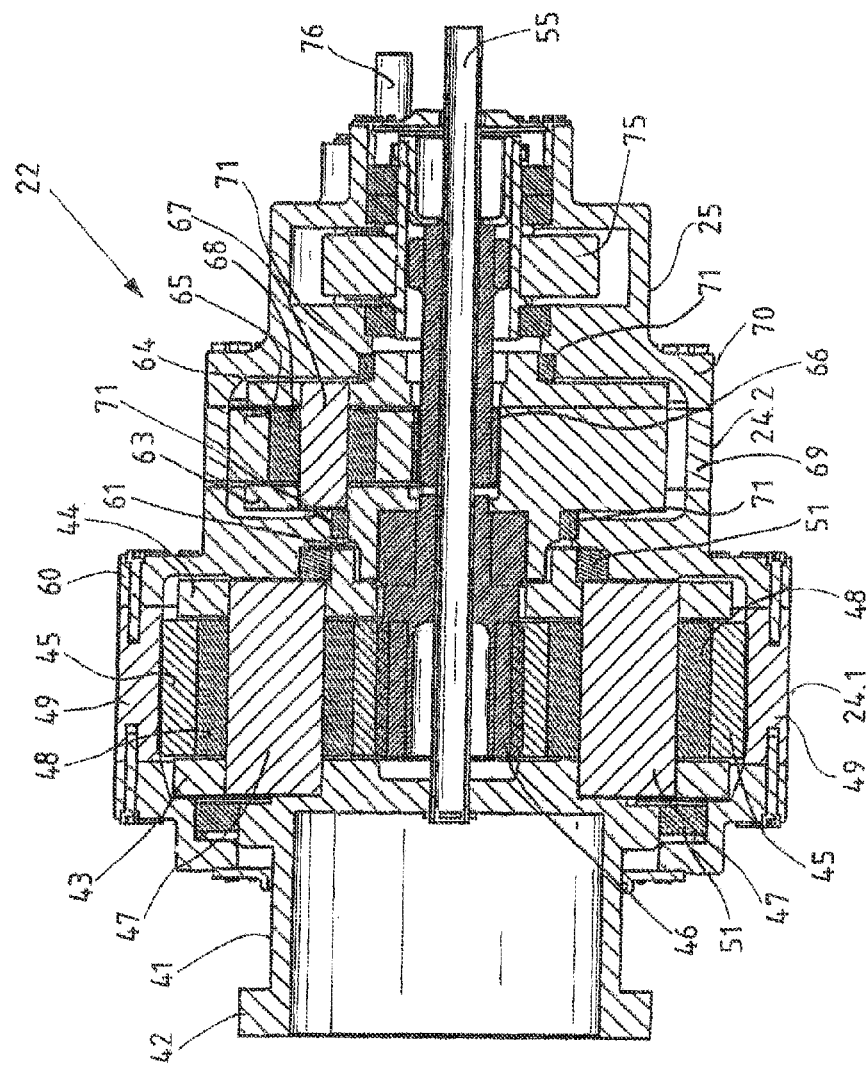
FIG. 4 is a sectional elevation view of the multi-stage gear mechanism.

FIG. 3 schematically shows a perspective view of a multi-stage gear mechanism 22 with a first planetary stage 24.1 and a second planetary stage 24.2. In addition, the multi-stage gear mechanism 22 has a spur gear stage 25 as a third stage. FIG. 4 schematically shows a cross-section through the gear mechanism shown in FIG. 3.

The gear mechanism 22 on the rotor-side has a planet gear carrier 41, which has a rotor shaft flange 42 for the connection to a rotor shaft. The planet gear carrier 41 extends into the housing of the gear mechanism 22, and in the interior of the housing 22 has two side plates 43, 44, which are distanced from each other. Planet gears 45, which have external teeth, are mounted between the side plates 43, 44 (see FIG. 4, 5). The planet gears 45 are arranged about a sun gear 46, wherein the sun gear 46 also has external teeth, which mesh with the external teeth of the planet gears 45.

Figure 5:
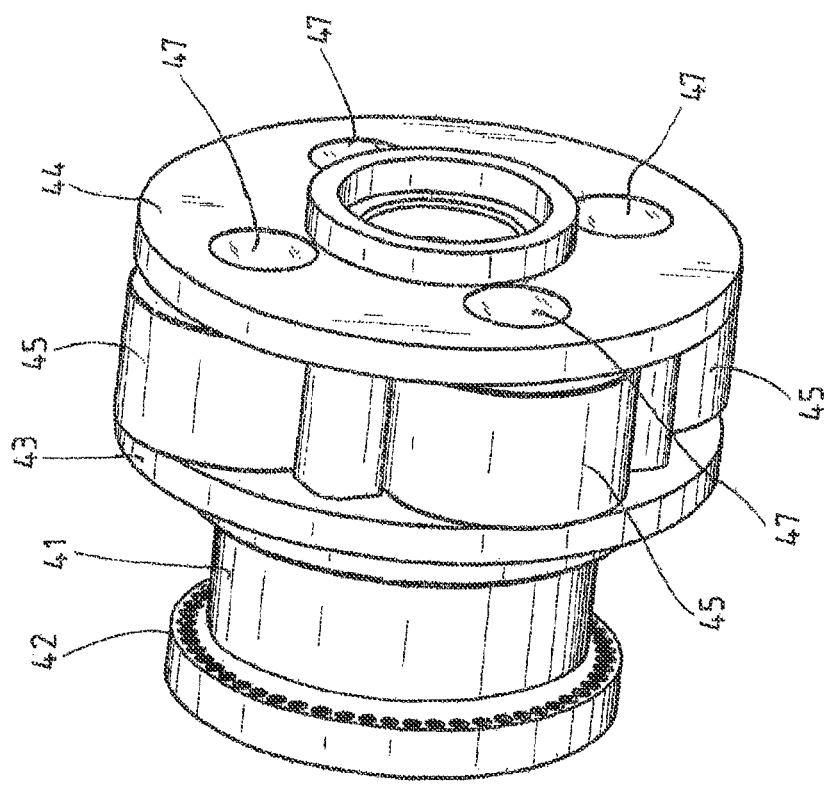
FIG. 5 is a perspective view of a planet gear carrier of a planetary stage of a gear mechanism according to the prior art.

FIG. 5 schematically shows a planet gear carrier 41 of the first planetary stage 24.1 having four planet gears 45, wherein for reasons of clarity the rear planet gear cannot be seen.

In general, the planetary stage 24.1 has four planet gears 45. In an exemplary embodiment not represented here, three planet gears can also be provided which are arranged about the sun gear 46 respectively offset in the circumferential direction by 120°.

In the cross-sectional representation shown in FIG. 4 only two planet gears 45 can be seen, wherein the planet gears are arranged about the sun gear 46 offset respectively by 90° (see FIG. 5).

The planet gears 45 (see FIG. 4) are mounted in the planet gear carrier 41 each using a planetary bolt 47 and a planet bearing 48, wherein the planetary bolts 47 are arranged fixed in the planet gear carrier 41. The planet bearings 48 can be roller bearings or also sliding bearings for example.

The planetary stage 24.1 (see FIG. 4) consists of the components: sun gear 46, planet gears 45, the planet gear carrier 41 and a ring gear 49 (see FIG. 3, 4), which has internal teeth, which mesh with the (external) teeth of the planet gears 45. The ring gear 45 is a component of the gear mechanism housing and surrounds the planet gears 45, and further components, arranged in the interior of the gear mechanism 22. Here the ring gear 49 is arranged fixed in the gear mechanism housing, wherein the ring gear 49 is designed such that the internal teeth thereof mesh with the external teeth of the planet gears 46.

In addition, the planet gear carrier 41 is mounted fixed to the housing, using bearings 51.

With a rotation of the rotor (see FIG. 1, reference number 12) due to movement of the wind, the planet gear carrier 41 is caused to rotate via the rotor shaft (see FIG. 2, reference number 16), wherein due to the bearing of the planetary bolts 47 in the planet gear carrier 41, the planet gears 45 roll between the ring gear 49, fixed to the housing, and the sun gear 46, whereby the sun gear 46 is also caused to rotate. Due to the sun gear 46 centered between the planet gears 45, the generated torque is transferred to the next stage, or respectively the second planetary stage 24.1 of the gear mechanism 22.

The sun gear 46 of the first planetary stage 24.1 is in operative engagement with a planet gear carrier 61 of the second planetary stage 24.2, which has two side plates 63, 64 spaced apart from each other, between which planet gears 65 are arranged in the circumferential direction. The planet gears 65 are mounted on the planet gear carrier 65, wherein the external teeth of the planet gears 61 mesh with the external teeth of an inner arranged sun gear 66. The three planet gears 65 of the second planetary stage 24.2 are arranged about the sun gear 66 each offset by 120°.

Further, the planet gears 65 are in operative engagement with the internal teeth of a ring gear 69 surrounding the planet gears 65 of the second gear mechanism stage 24.2. In addition, the planet gears 65 are mounted rotatably on the planet gear carrier 61, using appropriate planetary bolts 67 and corresponding bearings 68, wherein the planetary bolts 67 are arranged fixed in the planet gear carrier 61. The ring gear 69 is arranged fixed in the gear mechanism housing, wherein the ring gear 69 is designed with internal teeth so that the teeth thereof mesh with the external teeth of the planet gears. Due to the rotation of the planet gears 65 of the second planetary stage 24.2, the sun gear 66 of the second planetary stage 24.2 is caused to rotate, wherein the sun gear 66 is in operative connection with a spur gear 75 of the generator-side spur gear stage 25.

In addition, a cable tube 55 is arranged centrally in the gear mechanism 22 through which the electrical lines are guided from the interior of the wind power plant to the rotor.

On the output drive side, the spur gear 75 is coupled with a pinion (not shown here) to a generator-side output drive shaft 76.

As is further apparent from FIG. 3, a separation flange 60 is arranged between the ring gear 49 of the first planetary stage 24.1 and the ring gear 69 of the second planetary stage 24.2, and is connected to the ring gear 49 of the first planetary stage 24.1 and the ring gear 69 of the second planetary stage 24.2 using appropriate screws. Additionally, a further separation flange 70 is formed between the ring gear 69 of the second planetary stage 24.1 and the spur gear stage 25.

As further seen in FIG. 3, the separation flange 60 laterally has a torque support 62, wherein both sides of the gear mechanism 22 each are provided with a torque support.

FIG. 5 shows the planet gear carrier 41 as known according to the prior art, with the omission of the outer components of the gear mechanism. Here, the planet gears 45 are arranged between the side plates 43 and 44, wherein the side plates 43, 44 are connected together by means of the planetary bolts 47. For this purpose, the planetary bolts 47 are pressed fit in the side plates 43, 44, or respectively in the bolt receptacles of the side plates 43, 44.

Figure 6:
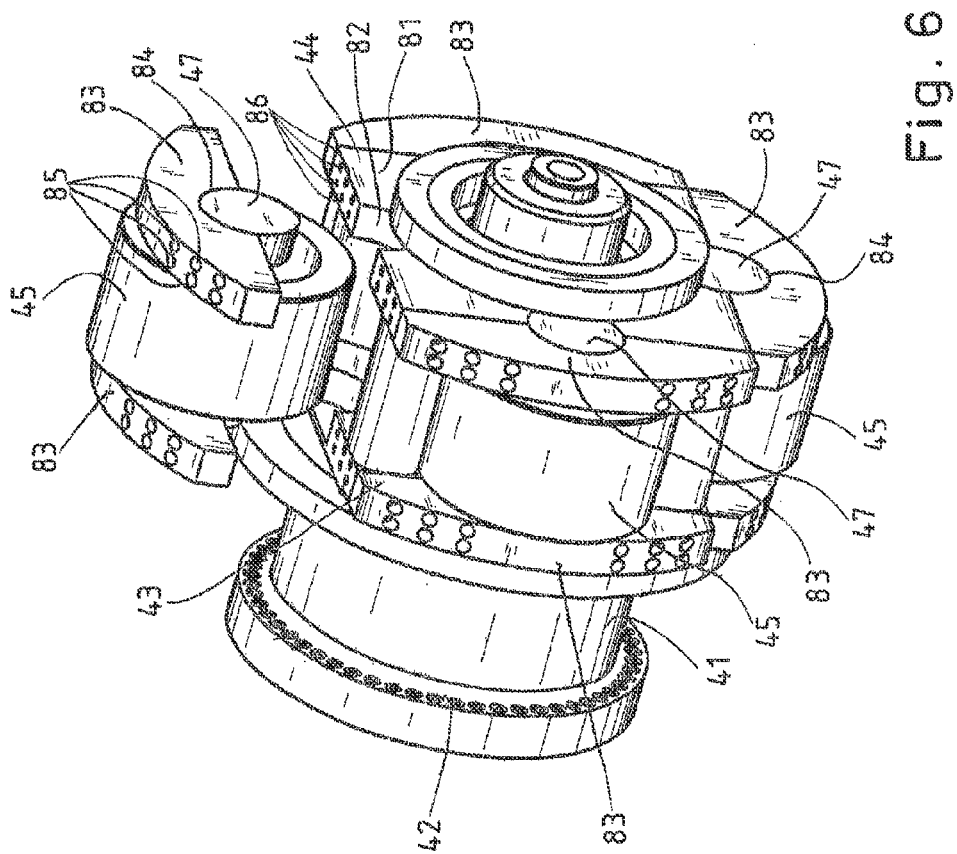
FIG. 6 is a perspective view of a planet gear carrier according to the invention having separable bolt receptacles for planetary bolts.

FIG. 6 shows an embodiment according to the invention of a planet gear carrier 41 in a schematic perspective representation. Here, the rear and front side plates 43, 44 are formed from multiple parts, wherein the side plate 44 has an inner side plate part 81 which has a square base area. With a planetary stage having three planets, or planet gears, the base area is substantially triangular. The inner side plate part 81 has semi-circular receptacles 82 arranged centrally on each side so that the planetary bolt 47 can be received in the semi-circular receptacle 82. In addition, the separable side plate 44 is formed from the inner side plate part 81 and four outer side plate parts 83, which can be or respectively are detachably connected to the inner side plate part 81 using screws or clamping bolts. Each of the outer side plate parts 83 has a semi-circular receptacle 84 so that with the arrangement of an outer side plate part 83 on one side of the inner side plate part 81, the receptacle 82 of the inner side plate part 81 with the receptacle 84 of the outer side plate part 83 forms a divided or separable circular bolt receptacle for the planetary bolt 47.

The outer side plate parts 83, on both sides of the semicircular receptacles 84, have holes 85 for receiving clamping elements, or respectively clamping bolts, wherein the clamping bolts are tensioned after introduction into the holes 85 and into holes 86 formed in the narrow sides of the inner side plate part 82. The outer side plate parts 83 are formed on the outside as partial circles, wherein with arrangement at the inner side plate part 81 and after tensioning the outer side plate parts 83 with the inner side plate part 81, a disc shaped circular side plate 44 is formed, wherein in the scope of the invention breaks can also be provided along the peripheral surface of the completely formed side plate 44.

The holes 85 and the holes 86 are formed in two rows on the outside of the outer side plate part 83 and the inner side plate part 81, wherein for tensioning the outer side plate part 83 with the inner side plate part 81, the length of the clamping elements, or respectively the clamping screws, decreases with increasing distance to the axis of the planetary bolts 47. In addition, reduced shank bolts are preferably used as screws or clamping elements, wherein in particular reduced shank bolts are inserted in the holes 85 that lie closer to the axis of the planetary bolts 47 than the holes 85 that have a greater distance to the axis of the planetary bolts 47.

As the side plate 43 and also the side plate 44 are formed from multiple parts by an inner side plate part and outer side plate parts, the planet gear carrier 41, in the region of the axes of the planetary bolts 47 and the bolt receptacles, is divided, wherein after loosening the screws, or respectively the connection, between the outer side plate part 83 and the inner side plate part 81, the planetary bolt 47 is exposed such that the planetary bolt 47 is freely accessible together with the planet gear 45, whereby the planet gear 45 can be removed radially outward together with the planetary bolt 47.

Figure 7:
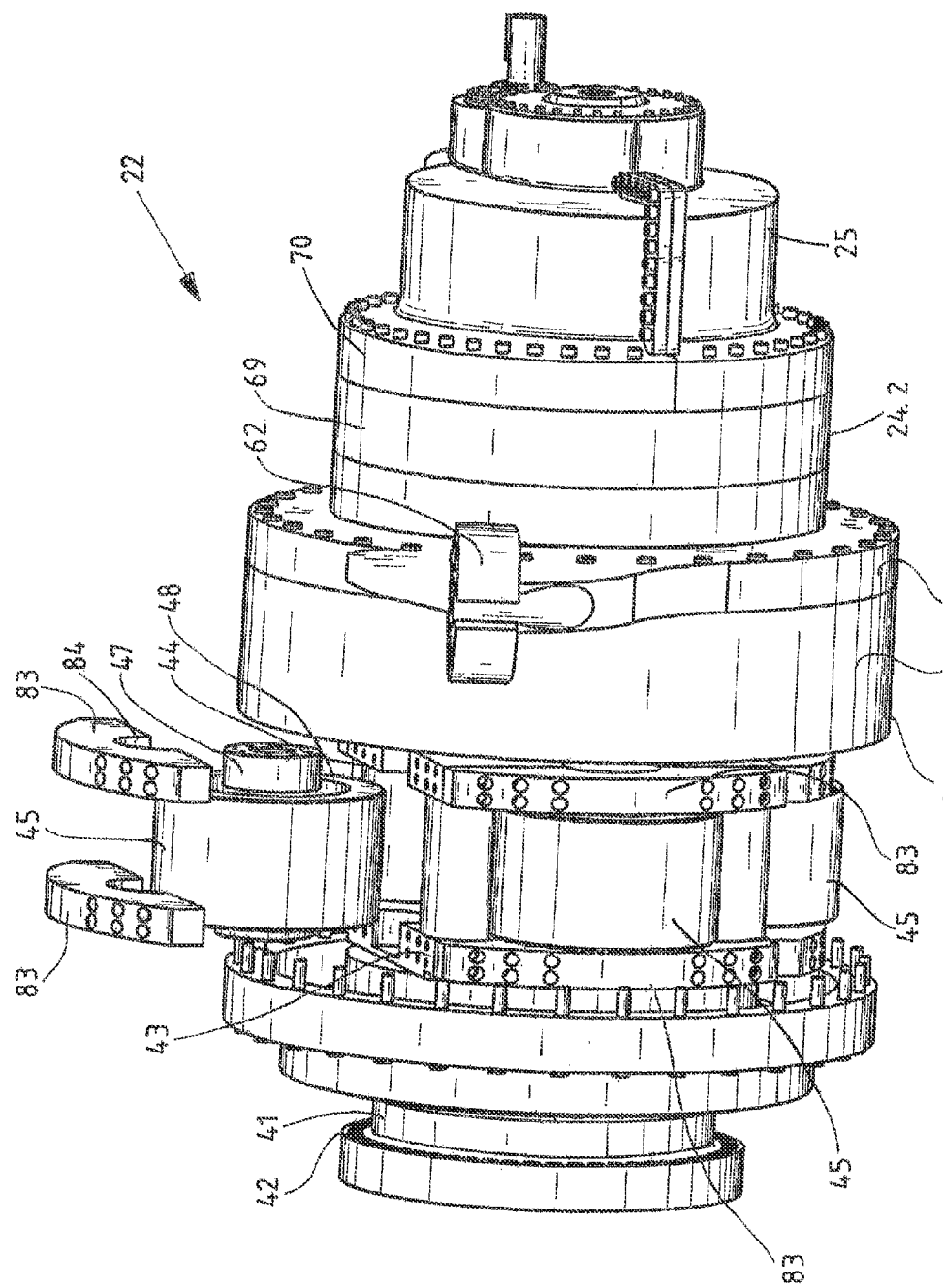
FIG. 7 is a perspective view of an opened, or respectively dismantled gear mechanism of a wind power plant.

This is represented schematically in FIG. 7 wherein for removing the planet gear 45, the ring gear 49 of the first planetary stage 24.1 together with the (remaining) cabin of the gear mechanism 22 is distanced in the axial direction from the planet gears 45 surrounded by the ring gear 49, wherein the axial distance between the planet gears 45 and the ring gear 49, or respectively the remaining cabin of the gear mechanism 22 connected to the ring gear 49, is selected such that after loosening the outer side plate parts 83 of the side plates 43 and 44, the planetary bolt 47 of the planet gear 45 to be removed is exposed by half, such that then the planet gear 45 is removed radially outward together with the planetary bolt 47 and the planet bearing. With constricted space conditions in the nacelle, the axial distance between the rear end of the planetary bolt and the front end of the ring gear can amount to only a few millimeters or nearly zero, such that the planet gear and the planetary bolt can just barely pass by at the front end of the ring gear.

Before removing the planet gear 45, the respective planet gear 45 to be removed is preferably arranged above the sun gear 46, and then the rotor is fixed. Then, the rotor-side planetary stage 24.1 and the generator-side second planetary stage 24.2 are separated from each other, wherein the second planetary stage 24.2 together with the spur gear stage 25 is moved axially away from the rotor by at least the width of the teeth of the planet gear 45. The ring gear 49 of the first planetary stage 24.1 can advantageously be moved together with the second planetary stage 24.2, because this way all axial shifts are performed in one works step, whereby a particularly fast exchange of the planet gear is possible.

The axial movement of the second planetary stage 24.2 together with the ring gear 49 and the spur gear stage 25 can occur using a handling device described above for the gear mechanism stages (see FIG. 2).

In addition, in another further development, the axial moving, or respectively shifting, and axial spacing of the ring gear 49 from the planet gears 45 of the first planetary stage 24.1 can occur alternatively or additionally using glide rails arranged laterally in the gear mechanism, wherein here the torque supports 62 can be connected to the glide rails. Here, the axial spacing of the ring gear 49 from the planet gears 45 preferably occurs laterally from the gear mechanism, for example with support from the torque supports of the gear mechanism and/or other preferred points of the gear mechanism cabin and/or using adjustable glide rails.

After releasing the connection between the outside outer side plate parts 83 and the inner side plate part 81 at the opened gear mechanism cabin, the double row of screws in the receptacles 85 is loosened, whereby the retention force of the press fit for the planetary bolt 47 in the separated bolt receptacle is reduced. Next, the planet gear 45 is extracted together with the planetary bolt 47 as a complete unit outward in the radial direction, preferably perpendicularly upward.

In another embodiment for removing a planet gear 45 from a planetary stage of a multi-stage gear mechanism of a wind power plant, it is provided in the scope of the invention that before extracting a planet gear, the respective planetary bolt is removed in an axial direction, before the respective planet gear is then removed radially. This is shown schematically in FIG. 8.

Figure 8:
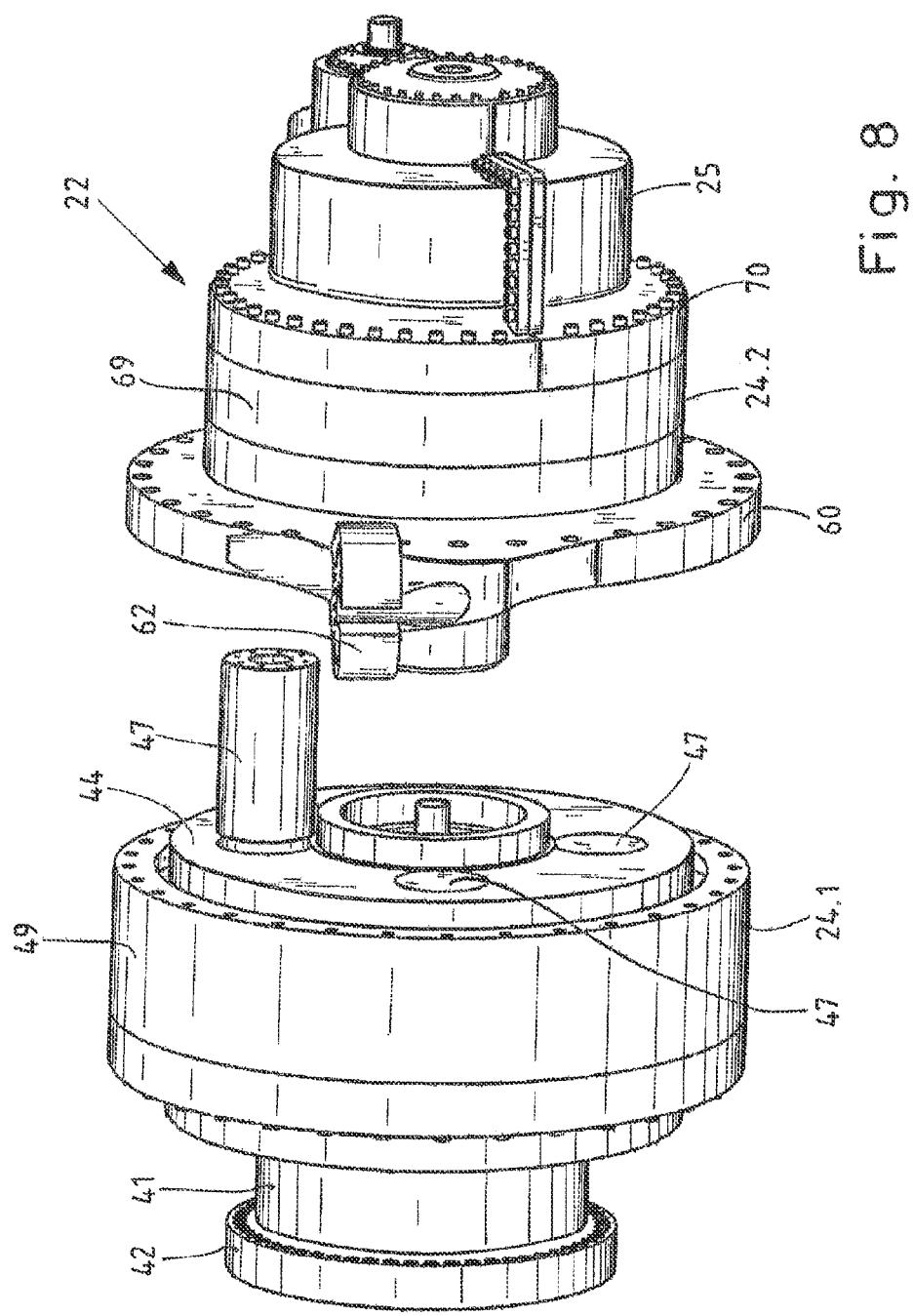
FIG. 8 is a partially exploded perspective view of a multi-stage gear mechanism of a wind power plant in a schematic view, separated at the first planetary stage in a schematic view.

FIG. 8 schematically shows an opened gear mechanism 22. The second gear mechanism stage 24.2, together with the spur gear stage 25, are axially separated from the ring gear 49 of the first gear mechanism stage 24.1 after loosening the first separation flange 60, whereby then the planetary bolt 47, after reducing the retention force of the press fit between the planet gear carrier and the planetary bolt 47, is shifted in the axial direction of the planetary bolt 47.

The planetary bolts 47 in a preferred embodiment are implemented tapering or stepped particularly in sections, that is, the substantially cylindrical basic shape of the planetary bolts 47 has a change of diameter at least at one location, preferably at several locations. A planetary bolt 47 tapered in this manner in the axial direction of the rotor, or respectively facing the rotor-side, is simpler to disassemble axially toward the generator side, that is, to disassemble axially in the generator direction, because the planet gear(s) 47 are accessible from the side facing the generator.

The axial disassembly of the planetary bolt 47 or the planetary bolts 47 in one embodiment is preferably performed with, or using, a particularly hydraulically driven extraction device, not shown, for the planet gears that is introduced between the gear mechanism stages 24.1, 24.2. In a preferred embodiment, the extraction device is implemented such that the device can be actuated by remote control, whereby maintenance personnel, for example assembly fitters, are not exposed to a safety hazard in the otherwise very restricted spaces between the gear mechanism stages 24.1, 24.2 by staying in the immediate hazardous region during the extraction procedure with very strong effective forces. Thus, the danger of injury for maintenance personnel while performing maintenance work is reduced.

For this purpose, in a first step, the planet gear 45 to be removed is initially brought into a preferred or predetermined position, in particular perpendicularly above the sun gear, and then the rotor is fixed. Then, the connection between the separation flange 60 and the ring gear 49 of the first planetary stage 24.1 is released, whereby the first planetary stage 24.1 with the ring gear 49 and the second planetary stage 24.2 are then distanced from each other in an axial direction.

In an alternative, the rotor-side connection between the ring gear 49 and the rotor-side face side of the gear mechanism cabin is released, whereby simultaneously the ring gear 49 together with the second planetary stage 24.2 and the spur gear 25 is distanced from the planet gear to be removed of the first planetary stage 24.1 by axial moving.

In particular, planetary bolts 47 are used here which have inner lines or channels so that by introducing oil at the contact points of the planetary bolt 47 with the fit surfaces of the circular receptacles of the side plates 43, 44, the holes or the bolt receptacle are widened due to pressurization, whereby after pressurization and widening of the holes, the respective planetary bolt 47 is or will be moved axially, whereby the planetary bolt 47 is disassembled.

Figure 10:
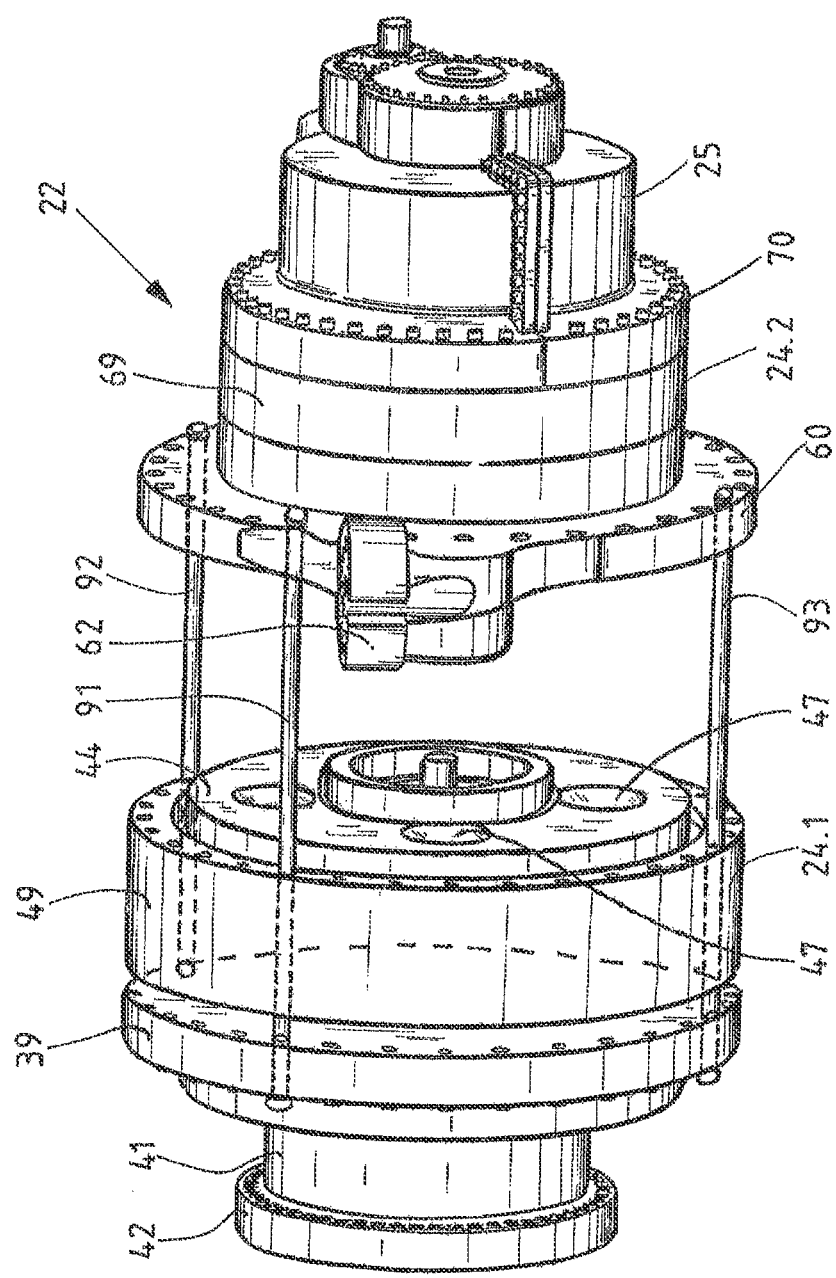
FIG. 10 is a partially exploded perspective view of a multi-stage gear mechanism of a wind power plant in a schematic representation, separated at the first planetary stage.

Then, after a possible axial movement, still to be performed, of the ring gear 49, as shown in FIG. 8 and also in FIG. 10, the planet gear 45 can be removed. Here, the planet gear 45 is extracted in the radial direction, preferably perpendicularly upward.

FIG. 10 shows a further opened gear mechanism 22 in a perspective representation, wherein after releasing the first generator-side separation flange 60 from the ring gear 49 of the first gear mechanism stage 24.1, the ring gear 49, together with the planet gear carrier 44 and the planetary bolts together with the planet gears is axially distanced from the rotor-side cover 39. In order to move the ring gear 49 axially in the direction of the generator, after releasing screw connections between the cover 39 and the ring gear 49 and between the ring gear 49 and the separation flange 60, corresponding guide bolts 91, 92, 93 are inserted in the screw holes, or respectively holes present at the outer periphery of the components, or holes at the outside of the cover 39, of the ring gear 49 and the separation flange 60, which guide bolts are arranged preferably uniformly or symmetrically at the periphery of the cover 39, the ring gear 49 and the separation flange 60. Here, the guide bolts 91, 92, 93 run axially parallel to the axes of rotation of the planet gears or of the spur gear, for example of a spur gear stage.

According to the exemplary embodiment in FIG. 10, three axially aligned guide bolts 91, 92, 93 are arranged in the through holes at the periphery of the cover 39, and the ring gear 49 and the separation flange 60. Here, in a preferred embodiment, the guide bolts 91, 92, 93 are pushed from the rotor side through the screw holes of the front, rotor-side cover 39 of the ring gear 49 up into the corresponding screw holes of the separation flange 60, and are fixed, preferably on one side. For this purpose, the screw holes present in the named components are used. Therefore it is particularly advantageous if in an embodiment at least two or three or more holes are provided in the components which have a larger diameter than the screw holes or holes of the cover 39, the ring gear 49 and of the separation flange 60 provided for the screw connections. By forming holes at the periphery of the components having larger diameters, it is simpler to provide guide bolts 91, 92 93 of a great diameter for the axial moving of the gear mechanism stage 24.2 and the ring gear 49 of the first gear mechanism stage 24.1. The axial spacing of the components, or respectively the axial move thereof, that is, of the separation flange 60 and the ring gear 49, can be performed manually, preferably using a spindle drive or the like, or also by a hydraulically or electro-mechanically supported drive. Using an appropriate drive, it is possible to perform the axial move of the ring gear 49 that generally weighs several tons.

In an alternative, instead of pressurization with oil through channels or lines of the planetary bolts, a planetary bolt 47 is used that has an internal lines for cooling means such that by introducing cooling means or a cryogenic liquid into the lines, for example a cryogenic liquid such as liquid nitrogen, the planetary bolt 47 in the bolt receptacles of the side plates is briefly cooled and due to the cooling contracts in the geometric dimensions thereof.

FIG. 9a schematically shows a cross-section through a planetary bolt 47, and FIG. 9b schematically shows a top view of the planetary bolt 47. Freely accessible holes 50 are formed on the front side of the planetary bolt 47, wherein the holes 50 are formed parallel to the longitudinal axis of the planetary bolt 47. The holes 50 on the end-side are connected communicating with each other via a channel 52. Thereby, a cooling means is filled into the holes 50 so that the planetary bolt held in the bolt receptacle of a planet gear carrier contracts and thereby after contracting is removed or can be removed in the axial direction from the bolt receptacle.

All named characteristics, including those taken from the drawings alone, and individual characteristics, which are disclosed in combination with other characteristics, are considered individually and in combination as essential to the invention. Embodiments according to the invention can be fulfilled through individual characteristics or a combination of several characteristics.

List of Reference Numbers 10 wind power plant
11 tower
12 rotor
13 rotor hub
14 rotor blades
15 machine cabin
16 rotor shaft
17 bearing mounting 18 bearing mounting
19 machine frame
21 rotor flange
22 multi-stage gear mechanism
23 stopping device
24.1 first planetary stage
24.2 second planetary stage
25 spur gear stage
26 rotor brake
27 clutch
28 generator
29 slip ring unit
31 lifting device
32 cross head
33 chain hoist
34 attachment plate
35 support
36 support
37 cross beam
38 support
39 cover
41 planet gear carrier
42 rotor shaft flange
43 side plate
44 side plate
45 planet gear
46 sun gear
47 planetary bolt
48 planet bearing
49 ring gear
50 hole
51 bearing
52 channel
55 cable tube
60 separation flange
61 planet gear carrier
62 torque support
63 side plate
64 side plate
65 planet gear
66 sun gear
67 planetary bolt
68 planet bearing
69 ring gear
70 separation flange
71 bearing
75 spur gear
76 output shaft
81 inner side plate part
82 receptacle
83 outer side plate part
84 receptacle
85 hole
86 hole
91, 92, 93 guide bolts

The invention claimed is:

1. A method for dismantling a multi-stage gear mechanism (22) of a wind power plant (10), the gear mechanism (22) being arranged in a nacelle (15) arranged on a tower (11) of a wind power plant (10), the gear mechanism (22) having at least one planetary stage (24.1, 24.2) that has a planet gear carrier (41, 61) and a plurality of planet gears (45, 65) held in the planet gear carrier (41, 61) using planetary bolts (47, 67), the planet gears (45, 65) being in connection with a ring gear (49, 69) of the planetary stage (24.1, 24.2) surrounding the planet gears (45, 65), the method comprising the steps of:

axially distancing the ring gear (49, 69) and the planet gears (45, 65) from each other along a substantially horizontal axis such that engagement between the planet gears (45, 65) and the ring gear (49, 69) is released, wherein at least one of the planet gears (45, 65) that are held in the planet gear carrier (41, 61) are accessible from an outside, releasing a retaining connection between the planet gear (45, 65) and the planet gear carrier (41, 61) before or after the axial distancing of the ring gear (49, 69) and the planet gears (45, 65), releasing the planetary bolt (47, 67) from a clamped position thereof in a clamp device before the removal of the planet gear (45, 65) from the retained position in a bolt receptacle of the planet gear carrier (41, 61), removing the planet gear (45, 65) released from the retaining connection to the planet gear carrier (45, 65) in a radially outward direction to a longitudinal axis of the gear mechanism.

2. The method according to claim 1, wherein the retaining connection between the planet gear (45, 65) and the planet gear carrier (41, 61) is released so that the retention force of the retaining connection through which a press fit between the planet gear carrier (41, 61) and the planetary bolt (47) is formed, is reduced, and then the planetary bolt (47) is moved for removal of the planet gear (45, 65).

3. The method according to claim 1, wherein the planetary bolt (47, 67), after releasing the clamped position or retaining position, is moved in a longitudinal axial direction or transverse to the axial direction.

4. The method according to claim 3, wherein after moving the planetary bolt (49, 67) in the longitudinal axial direction, the planetary bolt (47, 67) is moved relative to the planet gear (45, 65), and wherein subsequently in a further method step, the planet gear (45, 65) is removed.

5. The method according to claim 1, wherein before the removal of the planet gear (45, 65), the planetary bolt (47, 67) is supplied with oil using a channel (50, 52) formed in the planetary bolt (47, 67), such that by pressurizing the contact points between the planetary bolt (47, 67) and the planet gear carrier (41, 61) with the oil, the clamped points of the planetary bolt (47, 67) are loosened.

6. The method according to claim 3, wherein with movement of the planetary bolt (47, 67) transverse to the axial direction, the planetary bolt (47, 67) and the planet gear (45, 65) are removed together.

7. The method according to claim 1,
wherein the retaining connection between the planet gear (45, 65) and the planet gear carrier (41, 61) that is formed with one or two side plates (43, 44; 63, 64), is released so that the retention force of the retaining connection, which is formed by a bolt receptacle in the side plate (43, 44; 63; 64) or by bolt receptacles in both side plates (43, 44; 63, 64) for the planetary bolt (47, 67), is reduced, and wherein the bolt receptacle in the side plate (43, 44; 63; 64) or the bolt receptacles in the side plates (43, 44; 63; 64) are opened by releasing the connection of two side plate parts (81, 83) of one or of each side plate (43, 44; 63, 64), along a separation formed in the side plate (43, 44; 63; 64) or in the side plates (43, 44; 63, 64).

8. The method according to claim 1, wherein with the axial spacing of the ring gear (49, 69) and the planet gears (45, 65) from each other, the planet gears (45, 65) are moved with respect to the stationary, ring gear (49, 69), or the ring gear (49, 69) is moved with respect to the planet gears (45, 65) that are arranged in the fixed planet gear carrier (41, 61).

9. The method according to claim 1, wherein before the removal of the planet gear (45, 65), the planetary bolt (47, 67) is supplied with a cooling means using a channel (50, 52) formed in the planetary bolt (47, 67), such that by applying the cooling means into the at least one hole (50) of the planetary bolt (47, 67), the planetary bolt (47, 67) is loosened in the clamped position thereof.

* * * * *